United States Patent [19]

Scarola et al.

[11] Patent Number: 5,767,230
[45] Date of Patent: Jun. 16, 1998

[54] PROCESS FOR REMOVING VOLATILES FROM POST-CONSUMER RECYCLED POLYOLEFIN CHIPS

[75] Inventors: Leonard Sebastian Scarola, Union; Richard Gordon Angell, Jr., Bridgewater, both of N.J.

[73] Assignee: Ecoplast Corporation, Los Angeles, Calif.

[21] Appl. No.: 674,020

[22] Filed: Jul. 1, 1996

Related U.S. Application Data

[60] Provisional application No. 60/006,147, Nov. 2, 1995.

[51] Int. Cl.$^6$ ............................................. C08F 6/00
[52] U.S. Cl. ...................... 528/483; 528/503; 264/344; 34/368
[58] Field of Search ........................... 528/483, 503; 264/344; 34/368

[56] References Cited

U.S. PATENT DOCUMENTS

| | | | |
|---|---|---|---|
| 3,177,193 | 4/1965 | Scott | 528/483 |
| 3,177,953 | 4/1965 | Goebel et al. | 528/483 |
| 4,974,336 | 12/1990 | Hahn | 34/22 |
| 5,139,694 | 8/1992 | Kmiec | 252/174.23 |
| 5,292,863 | 3/1994 | Wang | 528/483 |
| 5,443,652 | 8/1995 | Scarola et al. | 134/7 |

FOREIGN PATENT DOCUMENTS 1272778  5/1972  United Kingdom.

*Primary Examiner*—Fred Teskin
*Attorney, Agent, or Firm*—Blakely, Sokoloff, Taylor & Zafman, LLP

[57] ABSTRACT

A process comprising contacting PCR polyolefin chips containing volatile impurities with a heated gas at a superficial velocity sufficient to substantially reduce the volatile impurities. This process is found to cause the chips (i) to be essentially free of odors and (ii) subject to resin composition and prior use, to meet FDA regulations for direct food contact.

6 Claims, No Drawings

PROCESS FOR REMOVING VOLATILES FROM POST-CONSUMER RECYCLED POLYOLEFIN CHIPS

This application claims the benefit of United States Provisional Application numbered 60/006,147 filed on Nov. 2, 1995.

TECHNICAL FIELD

This invention is related to a process for removing volatiles from post-consumer recycled polyolefins.

BACKGROUND INFORMATION

The post-consumer recycled (PCR) polyolefins contemplated for use in subject process can be exemplified by the PCR polyethylenes and PCR polypropylenes. The most typical of the PCR polyolefins are the PCR polyethylenes since these plastics are most readily available for recycling. The specifications for the PCR polyethylenes can be found under ASTM D-5203-91. As is well known, polyethylenes are originally prepared by conventional catalytic processes. Illustrative of post-consumer recycled polyethylene, as used herein, is polyethylene, which has passed through the hands of the manufacturer of the polyethylene, the fabricator, the industrial utilizer of the fabricated article, and, finally, the ultimate consumer. A similar path is taken by other polyolefins. Examples of fabricated articles are film, sheet, bottles, bags, and other containers such as medical containers, which can be sterilized at or above the temperature of boiling water; food containers for use in a microwave oven or for holding food during cooking; greenhouse film; mulch film; masking film for painting; and sunscreen oil containers.

Polyolefins absorb volatiles from materials that have been in contact with, or in close proximity to, them. When detergents are stored in polyethylene bottles, for example, the fragrances used in the soaps diffuse into the plastic and impart an odor. The odor may be objectionable if the resin is recycled and used for an application where no odor or a different odor is desired. Odor is not the only concern. Pesticides and other pollutants can be absorbed by polyolefins and impart unwanted characteristics to the polymer. If a recycled resin is to be used in an application where there is contact with food, the material must not impart contaminants to the food. In fact, the PCR polyolefin must meet FDA regulations for food contact.

Recognizing this deficiency in recycled polyolefins, industry is constantly investigating methods to reduce or essentially eliminate these pollutants. Purge bins have been effective devices for removing volatiles from polymers. They are especially useful when the particles being cleaned are small and round in shape. In the case of chopped plastic bottles, however, the chopping results in chips typically having dimensions from ⅜ inch to 1 and ¼ inches in diameter. The thickness of these particular chips ranges from 1/64 inch to 1/16 inch. Chips having this geometry do not perform well in conventional fluidized beds such as the fluidized bed described in U.S. Pat. No. 4,482,687. To achieve effective purging in these fluidized beds, each chip must be swept with a stream of cleaning fluid. With round particles it is easy for the fluid to pass through the bed and sweep each particle. When the bed is filled with chips stacked one on top of the other in a similar manner to stacked plates, however, it is very difficult for the fluid to pass between each chip. Rather, the cleaning fluid tends to take the path of least resistance and sweep only a small percentage of the chips.

DISCLOSURE OF THE INVENTION

An object of this invention is to provide a process for removing volatiles from chips comprised of PCR polyolefin. Other objects and advantages will become apparent hereinafter.

According to the present invention, such a process has been discovered. The process comprises contacting PCR polyolefin chips containing volatile impurities with a heated gas at a superficial velocity sufficient to substantially reduce the volatile impurities. This process is found to cause the chips (i) to be essentially free of odors and (ii) subject to resin composition and prior use, to meet FDA regulations for direct food contact.

A preferred embodiment of the process comprises contacting PCR polyolefin chips containing volatile impurities (i) in a stirred bed with a heated gas, said gas passing through the chips at a superficial velocity of at least about 0.9 foot per second or (ii) in a fluidized bed with a heated gas, said gas passing through the chips at a superficial velocity of at least about 4 feet per second.

DESCRIPTION OF THE PREFERRED EMBODIMENT(S)

PCR polyolefin chips are obtained by chopping up polyolefin containers or other extruded or molded products, which have been gathered at curbside. The PCR polyolefin chips can be described as irregular pieces of plastic, a major proportion (greater than 50 percent) by weight of which are each about 0.375 to about 1.25 inches in longest dimension and about 0.01 to about 0.07 in thickness. Preferably, at least about 70 percent by weight of the chips have these dimensions. A typical chopping device is a granulator comprised of a rotating drum having a cutting edge; sharp blades; and a screen with, for example, ⅝ inch holes. The chips are usually pelletized for further processing.

As noted above, the original polyolefin can be produced in a conventional manner by a wide variety of well known catalytic processes. The processes are generally distinguished by their catalyst systems and examples of same are as follows: magnesium/titanium based catalyst systems, which can be exemplified by the catalyst system described in U.S. Pat. No. 4,302,565; vanadium based catalyst systems such as those described in U.S. Pat. Nos. 4,508,842 and 5,332,793; 5,342,907; and 5,410,003 ; a chromium based catalyst system such as that described in U.S. Pat. No. 4,101,445; metallocene catalyst systems such as those described in U.S. Pat. Nos. 4,937,299 and 5,317,036; or other transition metal catalyst systems. Many of these catalyst systems are often referred to as Ziegler-Natta catalyst systems. Catalyst systems, which use chromium or molybdenum oxides on silica-alumina supports, are also useful. Typical processes for preparing the polyethylenes are also described in the aforementioned patents. Typical in situ polyethylene blends and processes and catalyst systems for providing same are described in U.S. Pat. Nos. 5,371,145 and 5,405,901. Insofar as polypropylene processes are concerned, U.S. Pat. Nos. 4,414,132 and 5,093,415 can be mentioned. These processes also use Ziegler-Natta, metallocene, etc. catalyst systems, but generally include an outside electron donor. The polyethylenes can include homopolymers; high (HDPE), medium, and low density polyethylenes; linear low density polyethylenes (LLDPE); and very low density polyethylenes (VLDPE), all of which can be made by low pressure processes, and various polymers made by high pressure techniques, e.g., homopolymers of ethylene, ethylene/vinyl acetate copolymers, and ethylene/ethyl acrylate copolymers.

The original polyolefin containers and other articles, which can be recycled, can be prepared by conventional extrusion techniques such as blown tubular film extrusion (see discussion in U.S. Pat. No. 4,814,135) and pipe and sheet extrusion, and by blow molding, injection molding, rotational molding, and slot casting.

Extruders and processes for extrusion are described in U.S. Pat. Nos. 4,169,679; 4,814,135; 4,857,600; 5,076,988; and 5,153,382. Examples of various extruders are a single screw type such as one modified with a blown film die and air ring and continuous take off equipment; a blown film extruder; and a slot cast extruder. Twin screw extruders can also be considered. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

While all of the various articles produced by the above mentioned techniques and apparatuses can be recycled, preferred articles for recycle are those made from FDA compliant polyethylenes, i.e. cleared for food contact applications, particularly beverage containers such as those used for milk, juice, and water. These containers are selected by a technique known as "source control", which simply means that they are sorted out by hand. The containers are then chopped up to provide the chips referred to above. Chopping is considered to be the most economical way to handle these containers, but, heretofore, the removal of volatile impurities from these chips was a problem. It will be seen that the source controlled chips contact only innocuous GRAS (generally recognized as safe) substances during the process of this invention, and, therefore, are suitable for direct contact with food.

The chips are preferably introduced into a stirred bed, and a heated gas such as nitrogen or other inert gas, or air, is passed through the stirred bed, the chips from the top and the gas from the bottom. The superficial velocity of the gas can be at least about 0.9 feet per second, and is preferably in the range of about 1.1 to about 2.1 feet per second. It will be understood that the smaller the chip, the lower the effective superficial velocity.

A typical stirred bed used in the process of this invention is a cylindrical vessel with the axis of the vessel in a vertical orientation. Hot gas such as air is introduced from the bottom of the vessel, flows in an upward direction, and exits from the top. A distributor plate is located in close proximity to the bottom of the vessel and directs the gas flow through many small holes. This insures the uniform distribution of the gas across the entire cross section of the vessel. A shaft along the axis of the vessel with protruding arms is rotated to keep the chips moving gently. The shaft generally rotates at a rate of about 2 to about 25 revolutions per minute (rpm), preferably rotates at a rate of about 3 to about 12 rpm, and most preferably rotates at about 4 to about 8 rpm. The chips rotate as a plug with the shaft and arms since they tend to lightly interlock. If this stirring is not provided, large air channels develop and only some of the chips are cleansed by the flowing gas.

The chips move in a plane parallel to the plane of the vessel and very little mixing occurs from top to bottom. This feature makes the process of this invention suitable for a continuous process since the last material introduced into the stirred bed is the last out. A preferred stirred bed will have stationary bars protruding from the walls of the vessel. These bars protrude into the stirred bed and prevent the entire bed from rotating with the shaft and arms. Six inch spacing between arms and six inch spacing between stationary bars, for example, can be used to good effect. The bars are centered between the rotating arms to provide a clearance of about 3 inches.

In order to use a fluidized bed, the sphericity (the closeness to being a sphere) of the particle or chip has to be considered. Sphericity for unusual shapes can be calculated by formula. Typical shapes that perform well in fluid beds have sphericity values between 0.7 and 1.0.

A perfect sphere has a value of 1.0.

The formula is as follows:

$$\text{Sphericity} = \frac{\text{surface area of equivalent volume sphere}}{\text{surface area of the particle}}$$

Using a chip from a polyethylene bottle that has dimensions of 0.7 inch in longest dimension and 0.02 inch in thickness as an example, the sphericity is 0.23. This value is substantially below that of shapes that are typically used in fluidized beds. The chips do not suspend in an air stream with bubbles flowing through the bed as is typical when the sphericity is between 0.7 and 1.0. The superficial velocity (the volume of air per unit time divided by the cross sectional area of the fluidized bed) is usually in the range of 0.5 to 2.0 feet per second for common fluidized bed operations. In this instance, even though the chips can become airborne in the fluidized bed at lower rates, the superficial velocity of the heated gas is preferably at least about 4 feet per second, and more preferably 6 to 15 feet per second, to be effective. Even at these velocities, however, clumps are formed on conventional fluidized bed distributor plates. That is one reason why the stirred bed is preferred. Further, the stirred bed uses less gas at a much lower superficial velocity than the fluidized bed, an important economic advantage.

The temperature of the gas in the stirred bed or fluidized bed can be in the range of about 50 to about 120 degrees C., and is preferably in the range of about 90 to about 115 degrees C. The upper limit of temperature should be below the melting point of the chips to be processed. The residence time in both of the beds can be in a range of about 1 to about 15 hours, and even longer, but it is preferably in the range of about 3 to about 10 hours.

Some preferred conditions for subject process are as follows: stainless steel vessel and other materials contacting the chips; insulated, flat bottom, top loading vessel; and sizing of vessel based on 5 hour residence time for natural chips and 6 hour residence time for colored chips.

The advantage of the invention is that the amount of volatile impurities in the chips can be substantially reduced, i.e., by more than about 90 percent by weight. In the preferred mode, the result is that the chips are essentially free of volatile impurities. The term "essentially free" means less than about 500 ppb, and preferably less than about 200 ppb.

The patents mentioned in this specification are incorporated by reference herein.

The invention is illustrated by the following examples. The results are given in parts per million (ppm) or parts per billion (ppb), i.e., parts by weight of impurity per million or billion parts by weight of PCR resin.

EXAMPLE 1

The following Table I is concerned with the removal of a common impurity, limonene, from PCR polyethylene chips as a function of time when cleaned with air at various temperatures in a fluidized bed. The superficial velocity is about 12 feet per second. At least 80 percent by weight of the chips referred to examples 1 to 3 have the dimensions stated above. Testing in all of the examples is done by head space gas chromatography.

TABLE I

| Cleaning Time | PPM Limonene at Temperatures | | |
|---|---|---|---|
| (hours) | 74° C. | 106° C. | 120° C. |
| 0 | 24.0 | 98.0 | 68.0 |
| 1 | 18.0 | 10.0 | 11.2 |
| 2 | 15.0 | 3.5 | 1.75 |
| 3 | 13.0 | 2.6 | 0.76 |
| 4 | 11.0 | 1.4 | 0.60 |
| 6 | 10.0 | 0.72 | 0.20 |
| 8 | 8.0 | 0.69 | 0.17 |

Note: Levels below 0.6 parts per million or 600 parts per billion are considered by the FDA to be safe for direct food contact.

EXAMPLE 2

The following Table II shows the result of analysis of PCR high density polyethylenes (HDPE). The density is in the range of 0.940 to 0.970 gram per cubic centimeter, and is generally at least 0.950 gram per cubic centimeter. Each impurity is introduced into a virgin HDPE bottle to saturation. The bottles are chopped into chips, and treated in a stirred bed with air heated to 110 degrees C. The superficial velocity is 1.46 feet per second. Testing is done by head space gas chromatography.

TABLE II

| Example | Treating Time (hours) | trimethyl pentane | xylenes | Impurity (ppm) limonene | 2,4-di-chloro phenol | methyl salicyl-ate |
|---|---|---|---|---|---|---|
| 1 | 0 | — | 320 | 75 | 31 | 280 |
| 2 | 1 | 16 | — | 45 | 3.0 | 37 |
| 3 | 1 | 12 | — | 41 | 3.7 | 42 |
| 4 | 2 | 7.3 | — | 16 | 1.1 | 15 |
| 5 | 2 | 5.1 | 48 | 14 | 0.79 | 12 |
| 6 | 3 | 3.2 | 17 | 6.4 | 0.23 | 3.7 |
| 7 | 3 | 5.3 | 27 | 7.0 | 0.56 | 7.2 |
| 8 | 4 | 1.6 | 9.9 | 3.3 | 0.14 | 2.4 |
| 9 | 4 | 1.9 | 8.8 | 3.3 | 0.10 | 2.1 |
| 10 | 5 | 2.1 | 6.6 | 2.4 | 0.11 | 1.9 |
| 11 | 5 | 0.27 | 2.5 | 1.2 | <0.1 | 0.61 |
| 12 | 6 | 0.61 | 2.9 | 1.3 | <0.1 | 0.72 |
| 13 | 6 | 0.24 | 1.4 | 0.71 | <0.1 | 0.42 |
| 14 | 10 | 0.16 | 0.26 | 0.2 | <0.1 | 0.11 |
| 15 | 10 | <0.1 | <0.1 | <0.1 | <0.1 | <0.1 |
| 16 | 20 | <0.1 | <0.1 | <0.1 | <0.1 | <0.1 |
| 17 | 20 | <0.1 | <0.1 | <0.1 | <0.1 | <0.1 |

EXAMPLE 3

The following Table III shows the result of analysis of curbside PCR HDPE containers. The densities are in the range of about 0.956 to about 0.968 gram per cubic centimeter, and are generally at least about 0.960 gram per cubic centimeter. The term "curbside" simply means that the containers are gathered from consumers, and the impurities come from the original contents of the containers or other liquids introduced into the containers by the consumers. The containers are chopped into chips, and treated in a fluidized bed with air heated to 105 degrees C. and at a superficial velocity of about 12 feet per second. Testing for organophosphate pesticides is effected according to "Organophosphorous Pesticides" 40 CFR 455, Method 622, Oct. 4, 1985, and "Test Methods for Evaluating Solid Waste", SW846, 3rd Edition, Methods 8140 and 8141, December 1987. Testing for polynuclear aromatic hydrocarbons (HPLC) is effected according to "Polynuclear Aromatic Hydrocarbons in Municipal and Industrial Wastewater", 40CFR 136, Method 610, Oct. 26, 1984, and "Test Methods for Evaluating Solid Waste", Method 8310, Polynuclear Aromatic Hydrocarbons, SW846, September 1986.

TABLE III

| Treating Time | (PPB) | | | |
|---|---|---|---|---|
| | 0 hours | 2 hours | 4 hours | 6 hours |
| Impurity Fragrance: | | | | |
| Limonene | >200,000 | 6300 | 900 | 540 |
| Pesticides: | | | | |
| Dursban ™ | 140 | 16 | <5 | <5 |
| Diazinon ™ | <9.3 | <9.3 | <9.3 | <9.3 |
| Malathion ™ | <5.5 | <5.5 | <5.5 | <5.5 |
| Dichlorvos ™ | <40 | <40 | <40 | <40 |
| Polynuclear Aromatic Hydrocarbon | | | | |
| naphthalene | 150 | <10 | <10 | <10 |
| 1-methyl naphthalene | 250 | 14 | <8 | 12 |
| 2-methyl naphthalene | 200 | <6 | <6 | <6 |
| acenaphthene | <20 | <5 | <5 | <5 |
| fluorene | 33 | <1 | <1 | <1 |
| phenanthrene | 120 | <2.5 | <2.5 | <2.5 |
| anthracene | 12 | <0.5 | <0.5 | <0.5 |
| fluoranthene | 45 | 5.5 | 1.6 | <10 |
| pyrene | 38 | 10 | 10 | 8.7 |

EXAMPLE 4

The following Table IV shows the result of analysis of PCR high density polyethylenes (HDPE). The density is in the range of 0.940 to 0.970 gram per cubic centimeter, and is generally at least 0.950 gram per cubic centimeter. The impurity, limonene, is introduced during the washing process. Limonene is a component of the detergent system. Milk, water, and juice bottles are collected at the curbside, chopped into chips, and washed in a commercial plastics recycling facility. Following washing and drying the chips are fed to a stirred bed vessel having an inside diameter of 36 inches. The air and chip temperature is 105 degrees C. The superficial air velocity is 1.37 feet per second. The agitator rotates at 9 rpm. Chips are added at a rate of 90 pounds per hour for five hours, and then the chips are removed at the same rate. Chip removal is through a rotary air lock discharging 3.75 pounds every 150 seconds. All chips have 5 hours of exposure to the hot air flow. The chips that have been washed and not treated by the clean up process have 23,000 ppb (parts per billion) limonene. Table IV gives limonene analysis in ppb for chips taken every 20 minutes for 5 hours.

TABLE IV

| Sample | Limonene | Sample | Limonene |
| --- | --- | --- | --- |
| 1 | 80  | 9  | 60 |
| 2 | 70  | 10 | 30 |
| 3 | 100 | 11 | 20 |
| 4 | 130 | 12 | 40 |
| 5 | 80  | 13 | 20 |
| 6 | 200 | 14 | 10 |
| 7 | 50  | 15 | 20 |
| 8 | 100 | 16 | 40 |

We claim:

1. A process comprising contacting PCR polyolefin chips containing volatile impurities (i) in a stirred bed with a heated gas, said gas passing through the chips at a superficial velocity of at least about 0.9 foot per second or (ii) in a fluidized bed with a heated gas, said gas passing through the chips at a superficial velocity of a least about 4 feet per second, wherein a major proportion by weight of the chips are about 0.375 to about 1.25 inches in longest dimension and have a thickness of about 0.01 to about 0.07 inch.

2. The process defined in claim 1 carried out in a stirred bed.

3. The process defined in claim 2 wherein the processed chips are essentially free of volatile impurities.

4. The process defined in claim 1 wherein the gas is air; the process temperature is in the range of about 50 to about 120 degrees C.; and the residence time is in the range of about 1 to about 15 hours.

5. The process defined in claim 2 wherein the superficial velocity is in the range of about 1.1 to about 2.1 feet per second.

6. A process comprising contacting PCR polyolefin chips in a stirred bed with air, said air passing through the chips at a superficial velocity in the range of about 1.1 to about 2.1 feet per second wherein at least 70 percent by weight of the chips are about 0.375 to about 1.25 inches in longest dimension and have a thickness of about 0.01 to about 0.07 inch; the temperature is in the range of about 90 to about 115 degrees C.; the residence time is in the range of about 3 to about 10 hours; and the processed chips are essentially free of volatile impurities.

* * * * *

UNITED STATES PATENT AND TRADEMARK OFFICE
CERTIFICATE OF CORRECTION

PATENT NO.    : 5,767,230
DATED         : June 16, 1998
INVENTOR(S)   : Scarola et al.

It is certified that error appears in the above-identified patent and that said Letters Patent is hereby corrected as shown below:

Title page,
Item [56], References Cited, U.S. PATENT DOCUMENTS, "3,177,953" reference, please delete "4/1965" and insert -- 1/1964 --.

Signed and Sealed this

Eighteenth Day of January, 2005

JON W. DUDAS
*Director of the United States Patent and Trademark Office*